United States Patent
Arienti et al.

(10) Patent No.: US 10,933,850 B2
(45) Date of Patent: Mar. 2, 2021

(54) AUTOMATIC CONTROL BRAKING SYSTEM FOR VEHICLES

(71) Applicant: FRENI BREMBO S.P.A., Bergamo (IT)

(72) Inventors: Roberto Arienti, Curno (IT); Carlo Cantoni, Curno (IT); Andrea Odoni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 253 days.

(21) Appl. No.: 16/067,207

(22) PCT Filed: Dec. 22, 2016

(86) PCT No.: PCT/IB2016/057942
§ 371 (c)(1),
(2) Date: Jun. 29, 2018

(87) PCT Pub. No.: WO2017/115245
PCT Pub. Date: Jul. 6, 2017

(65) Prior Publication Data
US 2019/0009761 A1    Jan. 10, 2019

(30) Foreign Application Priority Data

Dec. 29, 2015    (IT) .................. 102015000088595
May 4, 2016    (IT) .................. 102016000045767

(51) Int. Cl.
*B60T 8/40*    (2006.01)
*B60T 8/34*    (2006.01)
(Continued)

(52) U.S. Cl.
CPC .............. *B60T 8/345* (2013.01); *B60T 7/042* (2013.01); *B60T 8/38* (2013.01); *B60T 8/4077* (2013.01); *B60T 8/4081* (2013.01); *B60T 11/16* (2013.01)

(58) Field of Classification Search
None
See application file for complete search history.

(56) References Cited

U.S. PATENT DOCUMENTS 3,976,171 A    8/1976    Belart
4,989,925 A *    2/1991    Kohno .................. B60T 8/4036
                                                303/116.2
(Continued)

FOREIGN PATENT DOCUMENTS

DE          19549082 A1    7/1997
DE    102011085273 A1    5/2012
(Continued)

OTHER PUBLICATIONS

European Patent Office, International Search Report with written opinion issued in Application PCT/IB2016/057942, dated Mar. 7, 2017. 15 pages, European Patent Office, Rijswijk, Netherlands.
(Continued)

*Primary Examiner* — Todd Melton
(74) *Attorney, Agent, or Firm* — Marshall & Melhorn, LLC

(57) ABSTRACT

A braking system for vehicles having a master cylinder, and at least one braking device. The master cylinder has a first and a second output circuit, containing the same brake fluid. The first output circuit is intercepted by a first control valve fluidically connected to a braking simulator and to the at least one braking device so as to alternately connect the first output circuit to the braking simulator or to the at least one braking device for its actuation. The second output circuit is fluidically connected to the at least one braking device for its actuation, an automatic hydraulic actuation unit operatively connected to the master cylinder by a hydraulic actuation circuit containing an actuation fluid distinct from the brake fluid and fluidically separated from this. And, at least a
(Continued)

processing and control unit of the system that supervises the operation of the braking systems.

15 Claims, 8 Drawing Sheets

(51) Int. Cl.
    *B60T 8/38*     (2006.01)
    *B60T 11/16*    (2006.01)
    *B60T 7/04*     (2006.01)

(56) References Cited

U.S. PATENT DOCUMENTS

| | | | |
|---|---|---|---|
| 6,024,421 A | 2/2000 | Sinni | |
| 8,029,072 B2 * | 10/2011 | Miyazaki | B60T 8/4081 |
| | | | 303/113.1 |
| 8,939,519 B2 * | 1/2015 | Masuda | B60T 13/142 |
| | | | 303/114.1 |
| 9,010,880 B2 * | 4/2015 | Yamasoe | B60T 8/4077 |
| | | | 303/114.1 |
| 9,315,180 B2 * | 4/2016 | Jungbecker | B60T 8/4081 |
| 9,505,388 B2 * | 11/2016 | Kamiya | B60T 7/042 |
| 9,545,904 B2 * | 1/2017 | Masuda | B60T 13/147 |
| 9,937,910 B2 * | 4/2018 | Kuhlman | B60T 7/042 |
| 10,137,877 B2 * | 11/2018 | Feigel | B60T 8/4081 |
| 2005/0246086 A1 | 11/2005 | Motosugi et al. | |
| 2007/0278855 A1 * | 12/2007 | Hatano | B60T 8/4081 |
| | | | 303/116.1 |
| 2008/0010985 A1 * | 1/2008 | Miyazaki | B60T 8/4081 |
| | | | 60/565 |
| 2013/0127241 A1 | 5/2013 | Sakata | |
| 2014/0375113 A1 | 12/2014 | Higashi | |

FOREIGN PATENT DOCUMENTS

| | | |
|---|---|---|
| DE | 102011085986 A1 | 7/2012 |
| DE | 112013005983 T5 | 10/2015 |
| WO | 2015078651 A1 | 6/2015 |
| WO | 2015135608 A1 | 9/2015 |

OTHER PUBLICATIONS

State Intellectual Property Office of People's Republic of China, Search Report in Application CN20168077649, dated May 20, 2020.

* cited by examiner

AUTOMATIC CONTROL BRAKING SYSTEM FOR VEHICLES

FIELD OF APPLICATION

This invention relates to an automatic control braking system for vehicles.

STATE OF THE ART

In particular, the diffusion of kinetic energy recovery systems (KERS), increasingly powerful on racing cars, has necessitated the diffusion of systems able to automatically "mix" regenerative and dissipative braking. Regenerative braking is precisely the one that allows the recovery of energy during braking by converting the kinetic energy lost by the vehicle into electricity energy to be recovered and/or stored; dissipative braking is, instead, that "traditional" one that consists in converting/dissipating the kinetic energy of the vehicle as thermal energy, i.e., the heating of the brakes, which are typically disc brake callipers, pads and brake discs.

These systems actuate the traditional (or dissipative) braking system by means of "Brake By Wire" actuators: in other words, the user does not directly control the braking devices by directly operating a lever or pedal that puts pressure on the system fluidically connected to such braking devices, but the braking requested by the user, exerted by the actuation of a lever or pedal, is read and converted into the corresponding actuation of the braking devices by the related actuators.

The reduced actuation times (0.1-0.2 s to reach maximum pressure in the braking system) mean that these actuators require a high instantaneous power but also a low average power on the lap (when it comes to racing cars).

Moreover, being in a competition environment, the mass of the actuator also plays a crucial role and must be as low as possible.

PRESENTATION OF THE INVENTION

In the known solutions, therefore, always in the field of racing cars, the need for high instantaneous powers and low power supply voltages, leads to electrical components of large size and mass, not very suitable for racing applications.

This, therefore, reveals a glaring technical contradiction: to have the performance required, the components are too massive, while, with acceptable masses, the components are able to provide the required actuation powers.

Therefore, there is a need to solve the drawbacks and limitations mentioned in reference to the known art, namely there is a need to provide a braking system that ensures high power, reduced actuation times and, at the same time, components having small masses so as not to affect the performance of the vehicles on which such systems are installed.

In addition, for obvious safety reasons, automatic control braking systems must always ensure the maximum efficiency and reliability even in case of malfunction of the automatic control and/or the electrical circuit. Therefore, there is also felt the need to make available a braking system that always ensures reliability and correct braking in case of electrical malfunction.

These needs are met by an automatic control braking system for vehicles according to claim 1.

In particular, this need is met by a braking system for vehicles comprising a master cylinder, at least one braking device, the master cylinder being provided with a first and a second output circuit, containing the same brake fluid, wherein the first output circuit is intercepted by a first control valve fluidically connected to a braking simulator and to said at least one braking device so as to alternately connect the first output circuit to the braking simulator or to said at least one braking device for its actuation, and the second output circuit is fluidically connected to said at least one braking device for its actuation, an automatic hydraulic actuation unit operatively connected to the master cylinder by means of a hydraulic actuation circuit containing an actuation fluid distinct from said brake fluid and fluidically separated from it,
at least one processing and control unit of the system that supervises the operation of the system,
wherein
the master cylinder comprises a pump body that houses a first and a second float fluidically connected respectively to the first and second output circuit to pressurise said brake fluid,
wherein the first float is operatively connected to a manual actuation device, and the second float is operatively connected to the unit automatic hydraulic actuation unit to be actuated by the hydraulic actuation circuit.

According to an embodiment, the first and the second float are movable along a respective first and second actuation stroke parallel to an axial direction.

According to an embodiment, the first and the second float are parallel and in series with respect to an axial direction.

According to an embodiment, the first float is provided with a first pumping head slidingly housed inside a first output volume of the pump body, the second float is provided with a second pumping head slidingly housed inside a second output volume of the pump body, said first and second output volume being fluidically separated from each other.

According to an embodiment, the pump body defines an actuation chamber, fluidically connected to the hydraulic actuation circuit and housing an actuation head of the second float mechanically connected to the second pumping head of the second float.

According to an embodiment, the actuation chamber and the second output volume are fluidically separated from each other and filled with fluids distinct from each other.

According to an embodiment, the first control valve is operatively connected to the processing and control unit and is controlled by this so that, in a condition of automatic operation, the pressurised brake fluid in the first output circuit is sent to said braking simulator, fluidically disconnecting the first output circuit from the at least one braking device.

According to an embodiment, the first output circuit is provided with a first control valve operatively connected to the processing and control unit and controlled by this so that, in a condition of manual operation, the brake fluid in the first output circuit is sent to said at least one braking device, bypassing the braking simulator and directly actuating the at least one braking device.

According to an embodiment, the first control valve comprises a deviator device that alternately and exclusively connects the first output circuit to the braking simulator or to the braking device.

According to an embodiment, the first control valve comprises a first and a second shut-off valve, the first shut-off valve intercepting a branch of the first output circuit comprised between the pump body and the braking simulator, the second shut-off valve intercepting a branch of the first output circuit between the pump body and the braking device, said first and second shut-off valve being operatively connected to the processing and control unit so as to be opened/closed in an alternating and synchronised manner.

According to an embodiment, the first and the second output circuit are fluidically connected to the same brake fluid reservoir of the master cylinder.

According to a form of embodiment, the automatic hydraulic actuation unit comprises a high pressure pump suitable to pressurise the actuation fluid at a pressure of at least an order of magnitude higher than the pressure inside the first and of the second output circuit, for the actuation of the second float.

According to an embodiment, the automatic hydraulic actuation unit comprises a second control valve operatively connected to the processing and control unit and controlled by this so that, in a condition of manual operation, the second control valve is closed to hydraulically disconnect the automatic hydraulic actuation unit from the second float.

According to an embodiment, the braking simulator is equipped with a hydraulic pressure sensor operatively connected to the processing and control unit so as to indicate to the latter the user's braking action request.

According to an embodiment, said braking simulator comprises an accumulator tank of hydraulic fluid and elastic means for elastically opposing the first actuation stroke of the first float.

According to an embodiment, the second output circuit comprises a third control valve operatively connected to the processing and control unit and controlled by this so that, in a condition of manual operation, the third control valve is closed to hydraulically disconnect the second float from the braking device.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

Figure 1:
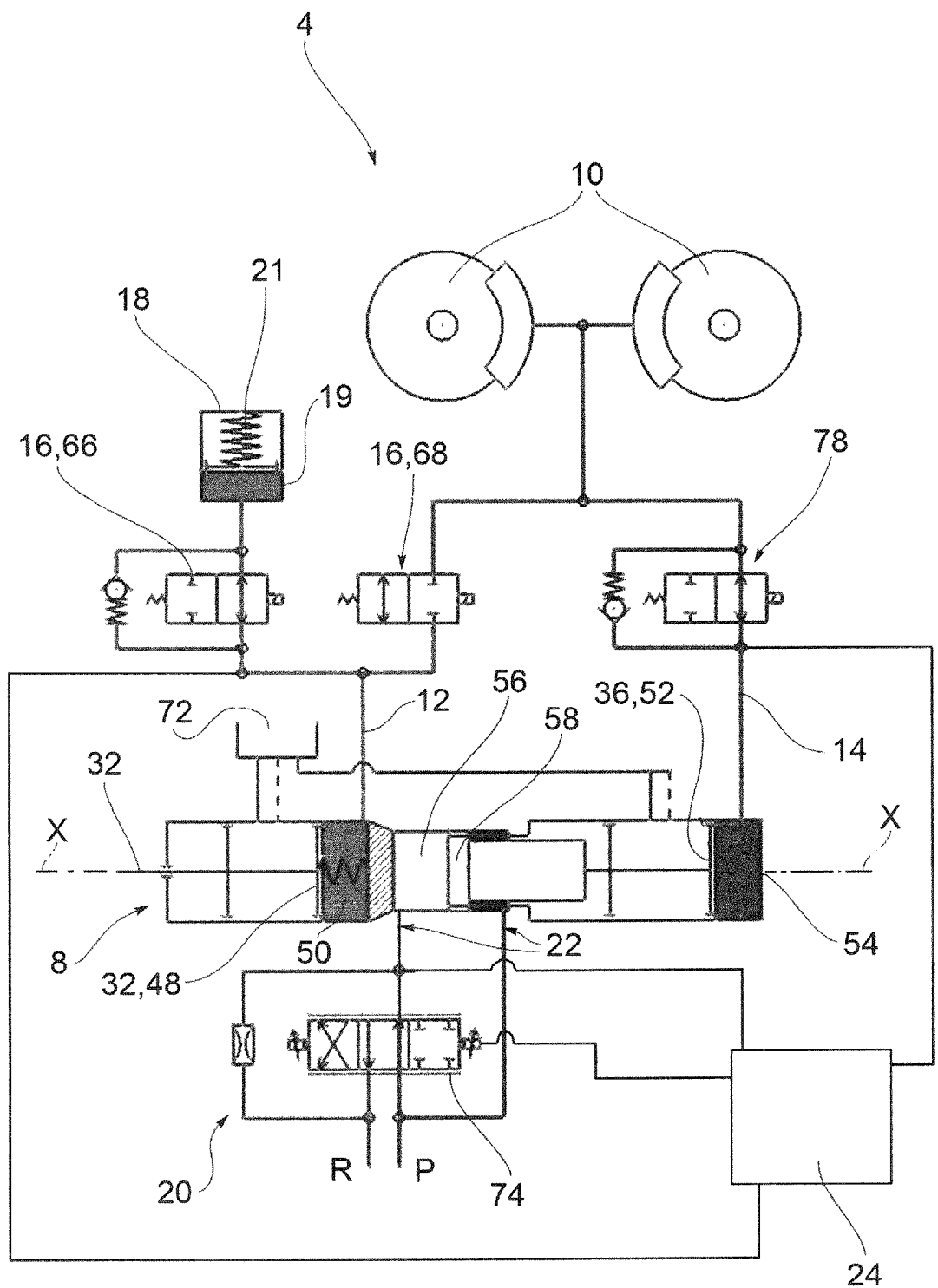
FIG. 1 is a schematic view of a braking system according to this invention, in a first operating condition or automatic operation condition.

With reference to the above figures, the reference number 4 globally indicates a braking system for vehicles.

First, for the purposes of this invention, it is necessary to specify that, by vehicles is meant, in general, motor vehicles, of any type, size and power, with two, three, four or more wheels, as well as two or more related axles; it is then obvious that this invention preferably, although not exclusively, refers to high-performance four-wheel vehicles, as explained in the introductory part.

The braking system for vehicles 4 comprises a master cylinder 8 and at least one braking device 10.

For the purposes of this invention, the type of braking device 10 used is irrelevant since it can be, preferably but not exclusively, a calliper for a fixed or floating type disc brake in a single piece or two half-callipers connected to each other and so on.

The master cylinder 8 is provided with a first and a second output circuit 12,14, containing the same brake fluid.

For example, the brake fluid of the first output circuit 12 and of the second output circuit 14 is a typical brake fluid known in the art having, preferably, characteristics for use in high-performance systems. This brake fluid is of the synthetic type, characterised by high hygroscopicity and high resistance to bubble formation to prevent fading phenomena. Such fluid ensures high reliability in the actuation of the braking device 10.

The first output circuit 12 is intercepted by a first control valve 16 fluidically connected to a braking simulator 18 and to said at least one braking device 10 so as to alternately connect the first output circuit 12 to the braking simulator 18 or to said at least one braking device 10 for its actuation.

The second output circuit 14 is fluidically connected to said at least one braking device 10 for its actuation.

According to an embodiment, the braking simulator 18 is a hydraulic accumulator suitable to receive and store the first brake fluid received from the first output circuit 12.

The braking system 4 according to this invention also comprises an automatic hydraulic actuation unit 20 operatively connected to the master cylinder 8 by means of a hydraulic actuation circuit 22 containing an actuation fluid distinct from said brake fluid of the first and second output circuit 12,14 and fluidically separated from said actuation fluid.

The actuation fluid of the hydraulic actuation circuit 22 is preferably a mineral fluid particularly suitable to working at much higher pressures, on the order of several hundreds of bar.

The braking system 4 also comprises a processing and control unit 24 of the system 4 that, as better explained below, supervises the operation of the braking system 4.

Advantageously, the master cylinder 8 comprises a pump body 28 that houses a first float 32 and a second float 36 fluidically connected respectively to the first output circuit 12 and to the second output circuit 14 to pressurise said brake fluid.

In particular, the first float 32 is operatively connected to a manual actuation device (not shown). For example, the manual actuation device can comprise an actuation lever or pedal, in a known manner. In this way the axial displacement of the first float 32 is obtained manually by the user through the manual operating device.

The second float 36 is operatively connected to the automatic hydraulic actuation unit 20 to be actuated by the hydraulic actuation circuit 22.

Therefore, in automatic operation condition, the user manually translates the first float 32 of a first actuating stroke 38, and the automatic hydraulic actuation unit 20 automatically moves the second float 36 of a second actuating stroke 40 so as to pressurise the second output circuit 14 and actuate the at least one braking device 10. Therefore, in automatic operating condition, the user has no direct control of the second float 36 that actuates the braking device 10, but is limited to translating the first float 32 receiving an elastic reaction from the braking simulator 18.

Preferably, the braking simulator 18 is equipped with a hydraulic pressure transducer or pressure sensor operatively, connected to the processing and control unit so as to indicate to the latter the user's braking action request.

In this condition, braking simulator 18 has the function of allowing a specific actuating stroke of the manual actuator actuated by the user and thus the first actuating stroke 38 of the first float 32, and to return to the user a sensation of gradually increasing resistance so as to allow him to modulate the desired braking, as in a conventional braking system.

For example, to this purpose, the braking simulator comprises an accumulator tank 19 of hydraulic fluid and elastic means 21 for elastically opposing the first actuating stroke 38 of the first float 32.

The first and the second float 32,36 are movable along a respective first and second actuating stroke 38,40 parallel to an axial direction X-X.

Preferably, the first and the second float 32,36 are parallel and in series with respect to an axial direction X-X.

According to an embodiment, the first and the second float 32,36 are axisymmetric with respect to said axial direction X-X.

Preferably, the pump body 28 has an overall cylindrical shape, with circular section, with a prevalent extension parallel to said axial direction X-X.

According to an embodiment, the first float 32 is provided with a first pumping head 48 slidingly housed in a first output volume 50 of the pump body 28.

The second float 36 is equipped with a second pumping head 52 slidingly housed in a second output volume 54 of the pump body 28.

Said first and second output volume 50,54 are fluidically separated from each other.

The pump body 28 also defines an actuation chamber 56, fluidically connected to the hydraulic actuation circuit 22 and housing an actuation head 58 of the second float 36 mechanically connected to the second pumping head 36 for the hydraulic actuation of the second float 36.

In other words, the second float 36 comprises, integrally, an actuation head 58 and a second pumping head 52: the actuation head 58 receives the thrust of the actuation fluid in the actuation chamber 56. This thrust is transmitted through the second pumping head 52 to the second output circuit that is pressurised and, in this way, actuates the braking device 10.

In this manual operating condition, the first control valve 16 fluidically disconnects the first output circuit 12 from the braking simulator 18 and fluidically connects the first output circuit 12 to said at least one braking device 10 for its actuation.

In this way, in the manual operation, the user's manual effort is used to actuate the braking device 10 through the action of the first float 32, i.e., all the fluid moved by the user actuates the braking device 10.

The actuation chamber 56 and the second output volume 54 are fluidically separated from each other and filled with fluids distinct from each other.

As seen, the first control valve 16 is operatively connected to the processing and control unit 24 and is controlled by this so that, in a condition of automatic operation, the pressurised brake fluid in the first output circuit 12 is sent to said braking simulator 18, fluidically disconnecting or by-passing the first output circuit 12 from the at least one braking device 10 and directly actuating the at least one braking device 10.

In case of malfunction of the automatic system, the system 4 brings itself in condition of manual operation: in particular, the first control valve 16 is operatively connected to the processing and control unit 24 and is controlled by this so that, in a condition of manual operation, the first brake fluid in the first output circuit 12 is sent to the braking device 10 for its direct actuation.

Figure 5:
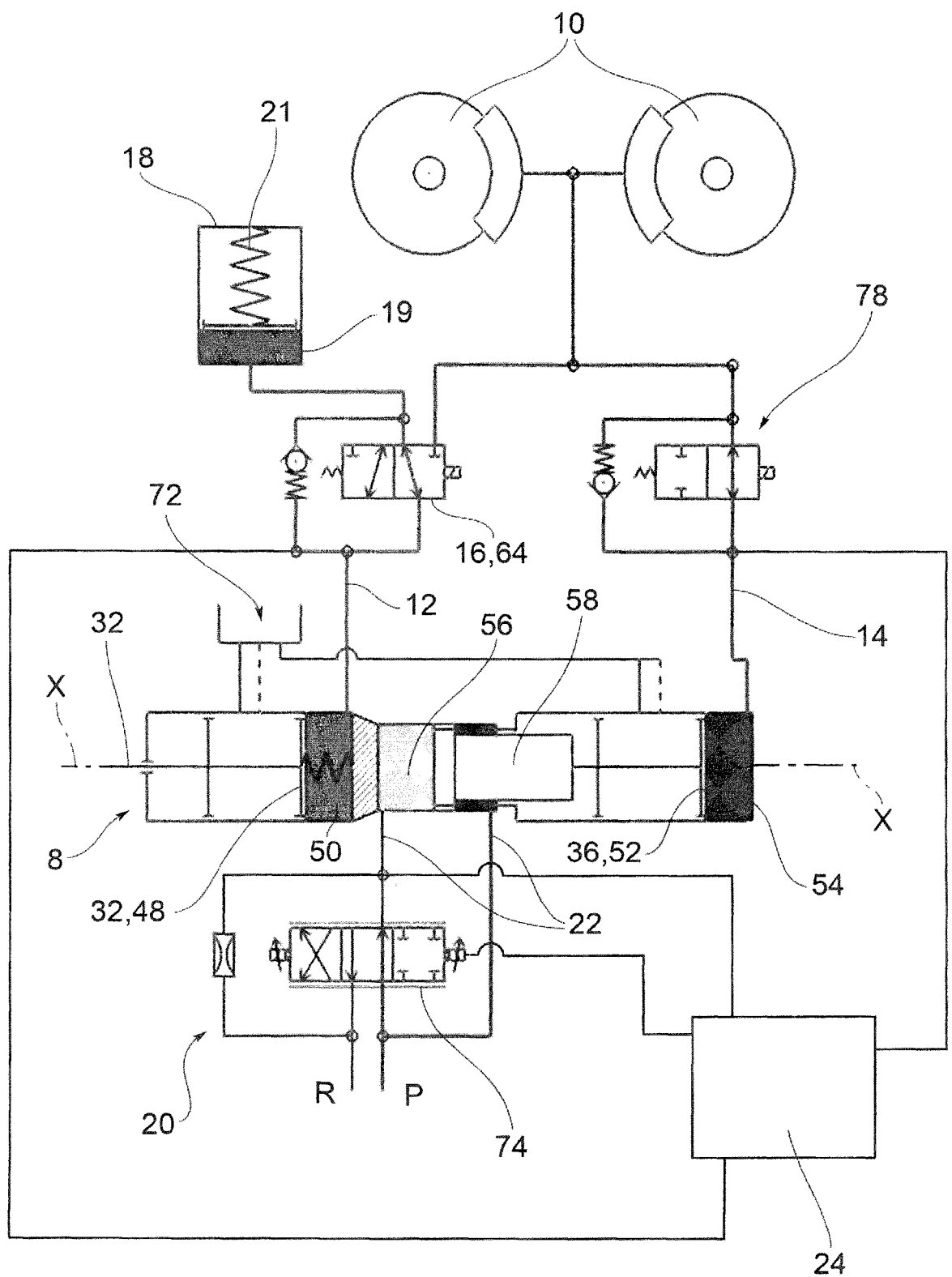
FIG. 5 is a schematic view of a braking system according to a further embodiment of this invention, in a first operating condition or automatic operation condition.
Figure 6:
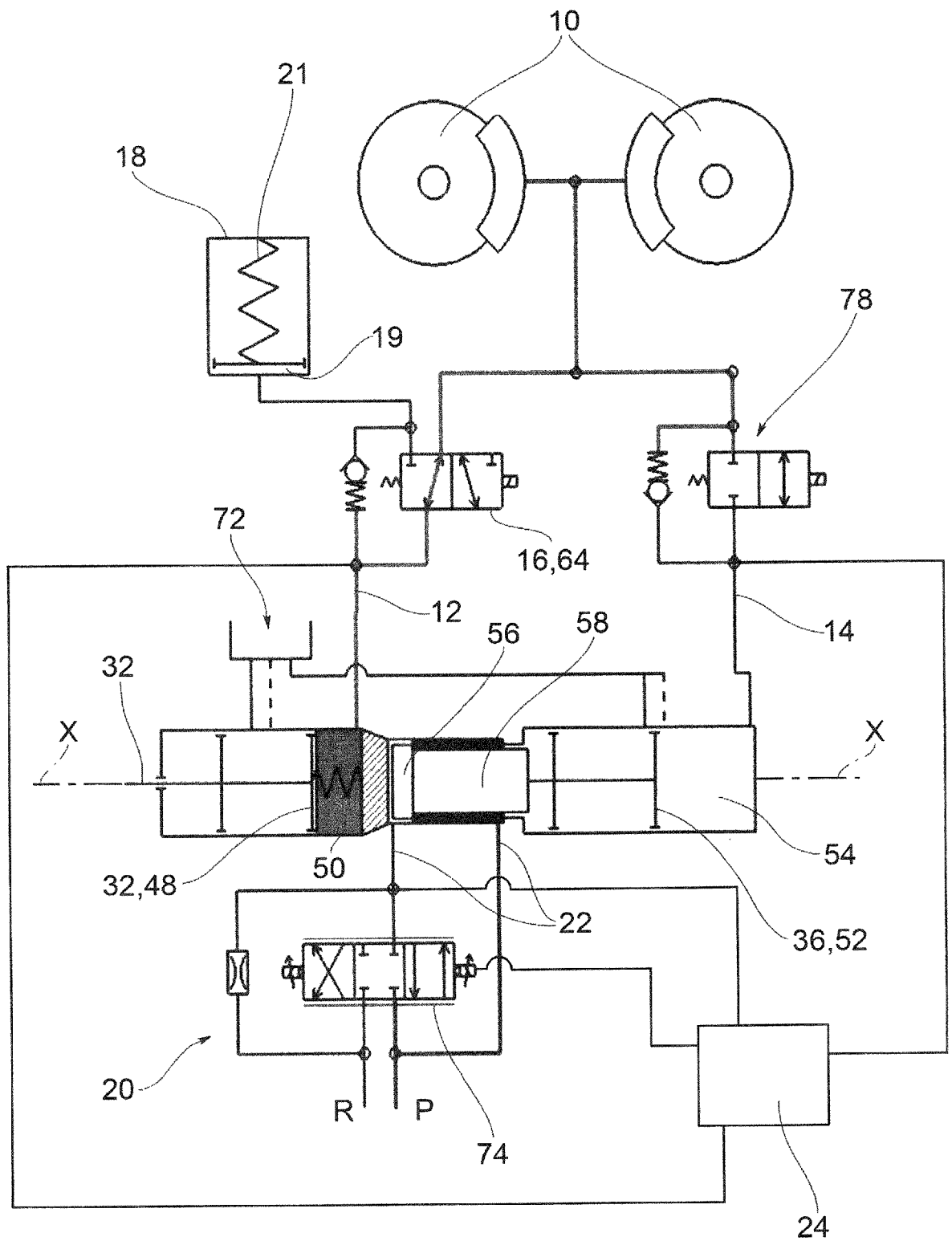
FIG. 6 is a schematic view of the braking system of FIG. 5, in a second operating condition or manual operating condition.
Figure 7:
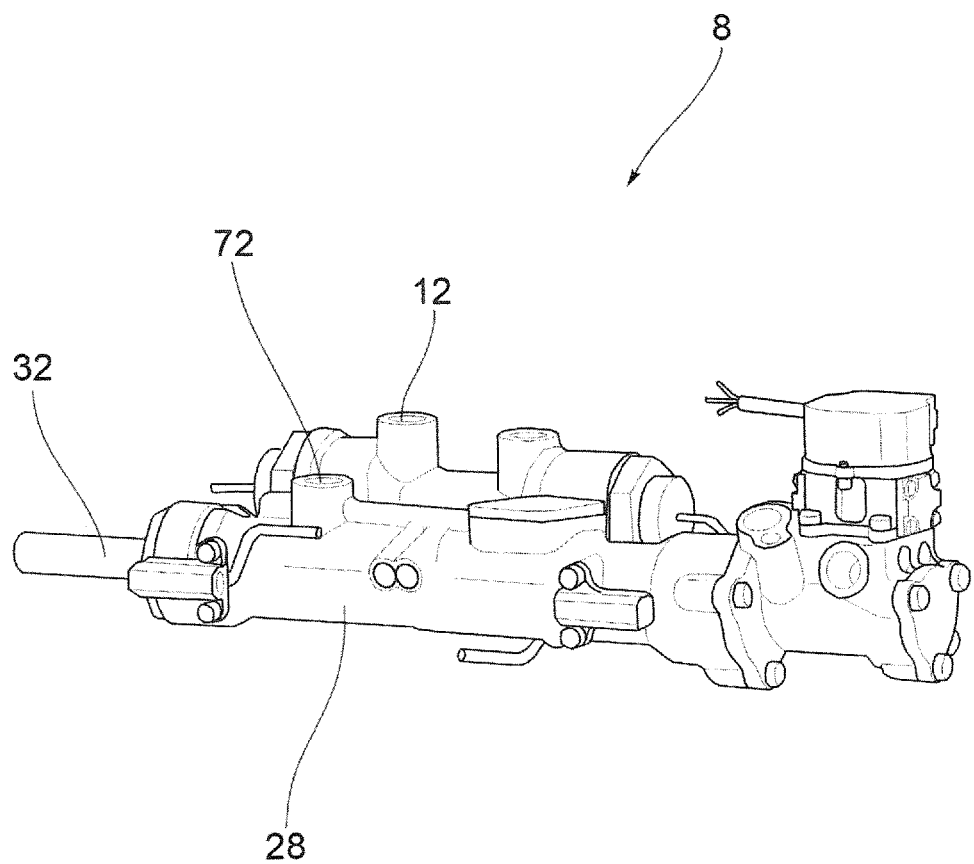
FIG. 7 is a perspective view of a master cylinder according to the embodiment of FIG. 5.
Figure 8:
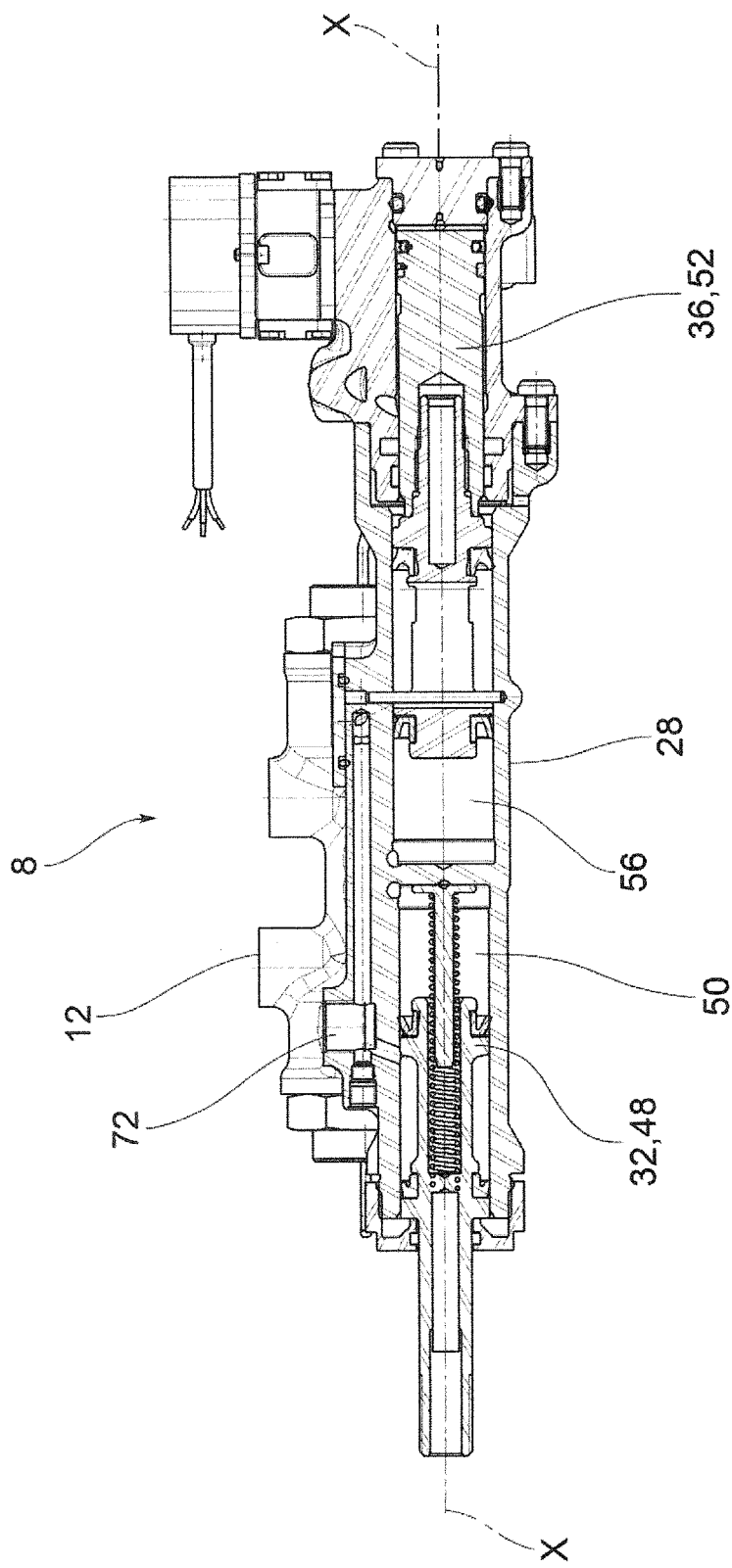
FIG. 8 is a sectional view of the master cylinder of FIG. 7.

According to a possible embodiment (FIGS. 5 to 8), the first control valve 16 comprises a deviator device 64 that alternately and exclusively connects the first output circuit 12 to the braking simulator 18 or to the first braking device 10.

Figure 2:
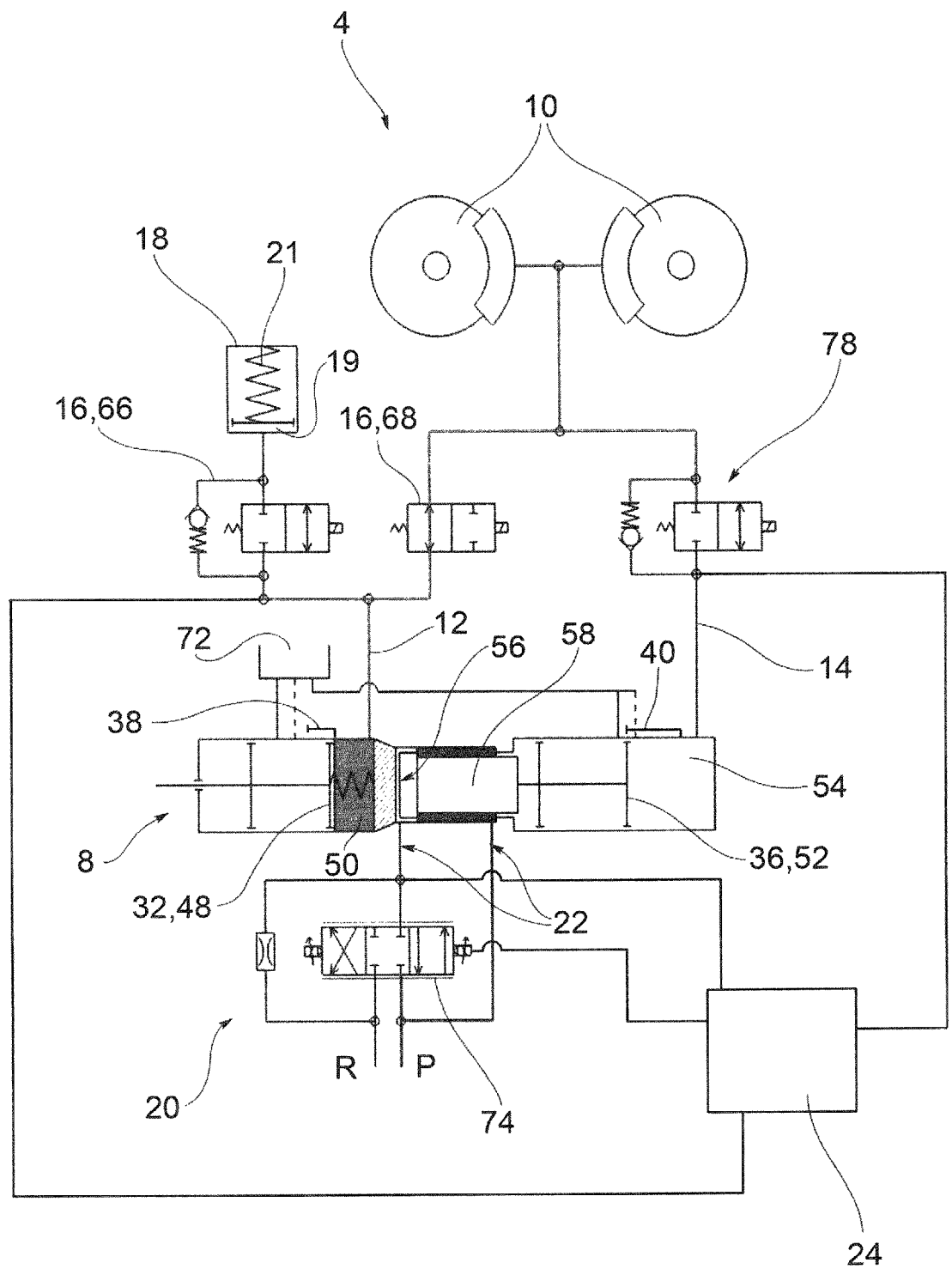
FIG. 2 is a schematic view of the braking system of FIG. 1, in a second operating condition or manual operating condition.
Figure 3:
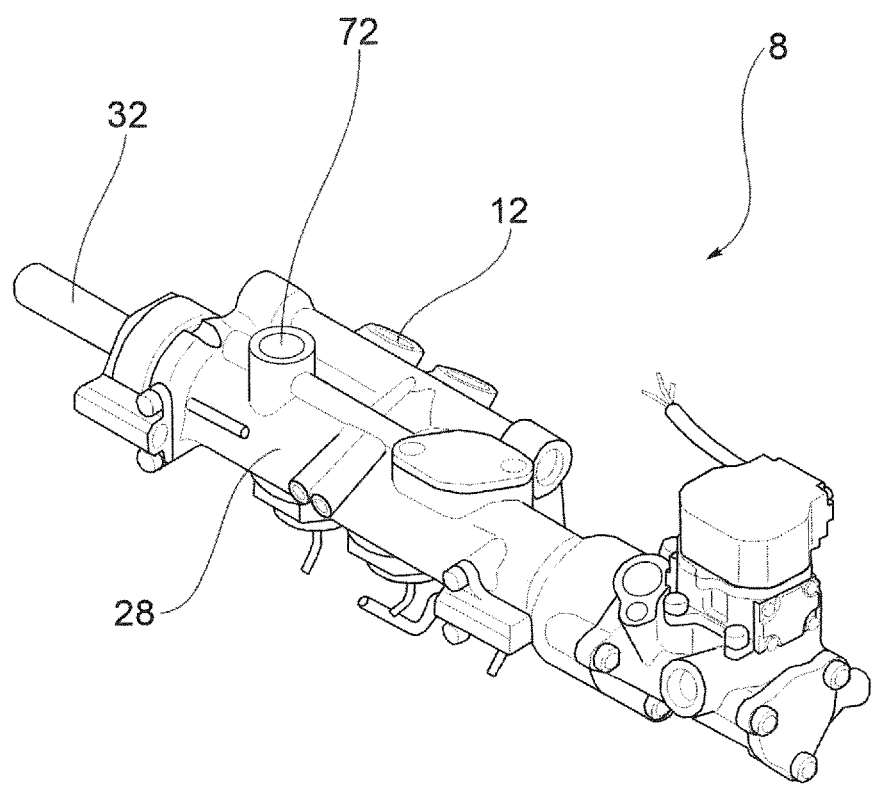
FIG. 3 is a perspective view of a master cylinder according to the embodiment of FIG. 1.
Figure 4:
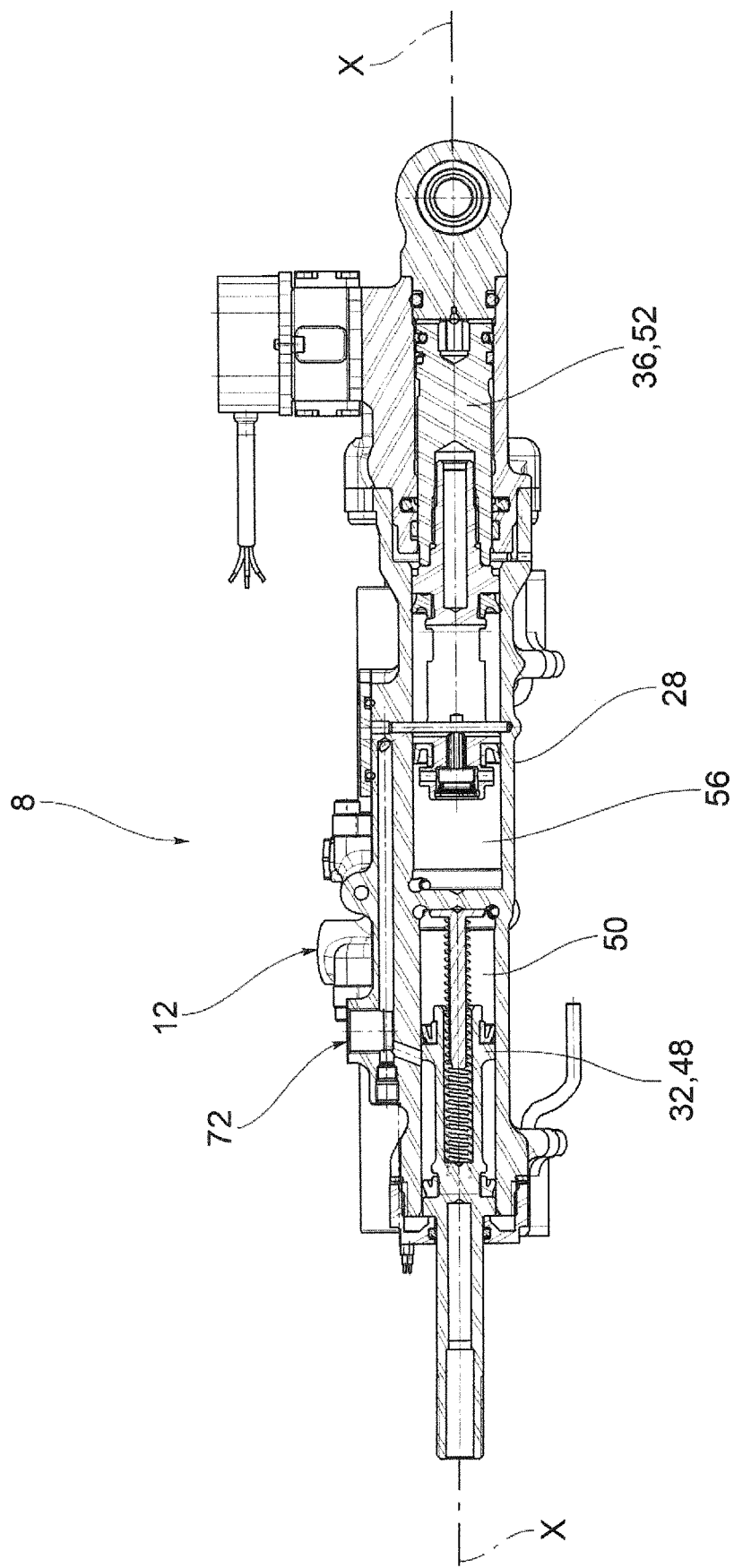
FIG. 4 is a sectional view of the master cylinder of FIG. 3.

According to a further embodiment of this invention (FIGS. 1 to 4), the first control valve 16 comprises a first and a second shut-off valve 66,68, the first shut-off valve 66 intercepting a branch of the first output circuit 12 comprised between the pump body 8 and the braking simulator 18, the second shut-off valve 68 intercepting a branch of the first output circuit 12 comprised between the pump body 8 and the braking device 10. Said first and second shut-off valve 66,68 are operatively connected to the processing and control unit so as to be opened/closed in an alternating and synchronised manner.

Preferably, the first and the second output circuit 12,14 are fluidically connected to the same brake fluid reservoir 72 of the master cylinder 8.

The brake fluid reservoir 72 is a reservoir that contains brake fluid and is fluidically connected to the first and second output volume 50,54, in a known manner, so as to insert into said output volumes 50,54 a volume of brake fluid that compensates for the incremental wear of the friction material of the braking device 10.

According to an embodiment, the automatic hydraulic actuation unit 20 comprises a high pressure pump (not shown) suitable to pressurise the actuation fluid at a pressure of at least an order of magnitude higher than the pressure inside the first and of the second output circuit 12,14, for the actuation of the second float 36.

According to an embodiment of this invention, the automatic hydraulic actuator unit 20 comprises an auxiliary circuit of the vehicle for the control of the auxiliary devices of the vehicle. Such auxiliary devices can include both vehicle accessories such as, for example, an actuation system of the distribution of the propulsion unit, power supply systems of the propulsion unit and the like.

For example, in certain categories of "top racing" vehicles (e.g., F1), the cars are equipped with a high-pressure hydraulic system that can be exploited, as the power generation unit, for the actuation of the braking devices.

In other categories, for design or regulatory choices, a high-pressure hydraulic system is not present on the vehicle and actuation can be performed using electrical and, in particular, electro-hydraulic systems.

For example, according to a possible embodiment, the automatic hydraulic actuation unit 20 comprises at least one motor operatively connected to a pump for pressurising the actuation fluid. The motor can also be replaced by a power take-off operatively connected, for example, to a drive shaft or auxiliary shaft of the propulsion unit of the associable vehicle on which the braking system 4 is mounted.

Preferably, said automatic hydraulic actuator unit 20 is an electro-hydraulic unit, in which the motor is an electric motor.

According to an embodiment, the automatic hydraulic actuation unit 20 comprises a second control valve 74 operatively connected to the processing and control unit 24 and controlled by this so that, in a condition of manual operation, the second control valve 74 is closed to hydraulically disconnect the automatic hydraulic actuation unit 20 from the second float 36 and the actuation chamber 56.

According to an embodiment, the second output circuit 14 comprises a third control valve 78 operatively connected to the processing and control unit 24 and controlled by this so that, in a condition of manual operation, the third control valve 78 is closed to hydraulically disconnect the second float 36 from the braking device 10.

As can be appreciated from the description, the braking system for vehicles according to the invention allows overcoming the drawbacks presented in the prior art.

In particular, the brake system for vehicles according to this invention allows solving the technical contradiction of the systems of the prior art, which consists in the fact that, to obtain the required performance, the components are too massive while, with acceptable masses, the components are unable to provide the required actuation powers.

The proposed solution also allows exploiting the advantage of a hydraulic application even on vehicles not equipped with a high-pressure hydraulic system: in fact, for such vehicles it is possible to use a specific electro-hydraulic unit able to pressurise a fluid pressure suitable to operate the actuators of the braking devices.

The braking system according to this invention ensures safe conditions; in fact, in case of malfunction of the automatic hydraulic actuation unit, the system automatically passes to the manual operating condition, i.e., to a condition of safety, in which it ensures direct manual control of the braking devices by the user, through the actuation of the manual actuator device.

Under standard conditions, i.e., in the first automatic operating condition, the system provides "BBW" or "brake-by-wire" operation in such a way as to obtain fast, powerful and reliable braking that always meets the request for braking torque that the user makes by operating the manual actuator.

Furthermore, this present invention provides a simplified hydraulic diagram, for equality of operating mode, with respect to the BBW system solutions of the known art.

Moreover, this invention provides a single component for all functions of the BBW system, including the hydraulic pump actuated by the driver. This reduces the costs, weights and dimensions of the braking system.

This solution also allows incorporating the driver hydraulic pump and installing everything on the e the pilot hydraulic pump and installing it all on the pedal assembly, with consequent simplification of the system.

Obviously, the system according to this invention can be easily and advantageously supplemented with additional operating functions such as, for example, the automatic management of braking to avoid locking phenomena (ABS).

A person skilled in the art, in order to satisfy contingent and specific needs, may make numerous modifications and variations to the braking systems described above, all however contained within the scope of the invention as defined by the following claims.

The invention claimed is:

1. A braking system for vehicles, comprising:
a master cylinder,
at least one braking device,
the master cylinder being provided with a first and a second output circuit, containing the same brake fluid, wherein the first output circuit is intercepted by a first control valve fluidically connected to a braking simulator and to said at least one braking device so as to alternately connect the first output circuit to the braking simulator or to said at least one braking device for its actuation, and the second output circuit is fluidically connected to said at least one braking device for its actuation,
an automatic hydraulic actuation unit operatively connected to the master cylinder by a hydraulic actuation circuit containing an actuation fluid distinct from said brake fluid and fluidically separated from it,
at least one processing and control unit of the system that supervises the operation of the braking system,
wherein
the master cylinder comprises a pump body that houses a first and a second float fluidically connected respectively to the first and second output circuit to pressurise said brake fluid,
wherein the first float is operatively connected to a manual actuation device, and the second float is operatively connected to the unit automatic hydraulic actuation unit to be actuated by the hydraulic actuation circuit,
wherein the first float is provided with a first pumping head slidingly housed inside a first output volume of the pump body, the second float is provided with a second pumping head slidingly housed inside a second output volume of the pump body, said first and second output volume being fluidically separated from each other.

2. The braking system for vehicles according to claim 1, wherein the first and the second float are movable along a respective first and second actuation stroke parallel to an axial direction.

3. The braking system for vehicles according to claim 1, wherein the first and the second float are parallel and in series with respect to an axial direction.

4. The braking system for vehicles according to claim 1, wherein the pump body defines an actuation chamber, fluidically connected to the hydraulic actuation circuit and housing an actuation head of the second float mechanically connected to the second pumping head of the second float.

5. The braking system for vehicles according to claim 4, wherein the actuation chamber and the second output volume are fluidically separated from each other and filled with fluids distinct from each other.

6. The braking system for vehicles according to claim 1, wherein the first control valve is operatively connected to the processing and control unit and is controlled by this so that, in a condition of automatic operation, the pressurised brake fluid in the first output circuit is sent to said braking simulator, fluidically disconnecting the first output circuit from the at least one braking device.

7. The braking system for vehicles according to claim 1, wherein the first output circuit is provided with a first control valve operatively connected to the processing and control unit and controlled by this so that, in a condition of manual operation, the brake fluid in the first output circuit is sent to said at least one braking device, bypassing the braking simulator and directly actuating the at least one braking device.

8. The braking system for vehicles according to claim 1, wherein the first control valve comprises a deviator device that alternately and exclusively connects the first output circuit to the braking simulator or to the braking device.

9. The braking system for vehicles according to claim 1, wherein the first control valve comprises a first and a second shut-off valve, the first shut-off valve intercepting a branch of the first output circuit comprised between the pump body and the braking simulator, the second shut-off valve intercepting a branch of the first output circuit between the pump body and the braking device, said first and second shut-off valve being operatively connected to the processing and control unit so as to be opened/closed in an alternating and synchronised manner.

10. The braking system for vehicles according to claim 1, wherein the first and the second output circuit are fluidically connected to the same brake fluid reservoir of the master cylinder.

11. The braking system for vehicles according to claim 1, wherein the automatic hydraulic actuation unit comprises a high pressure pump suitable to pressurise the actuation fluid at a pressure of at least an order of magnitude higher than the pressure inside the first and of the second output circuit, for the actuation of the second float.

12. The braking system for vehicles according to claim 1, wherein the automatic hydraulic actuation unit comprises a second control valve operatively connected to the processing and control unit and controlled by this so that, in a condition of manual operation, the second control valve is closed to hydraulically disconnect the automatic hydraulic actuation unit from the second float.

13. The braking system for vehicles according to claim 1, wherein the braking simulator is equipped with a hydraulic pressure sensor operatively connected to the processing and control unit so as to indicate to the latter the user's braking action request.

14. The braking system for vehicles according to claim 1, wherein said braking simulator comprises an accumulator tank of hydraulic fluid and elastic means for elastically opposing the first actuation stroke of the first float.

15. The braking system for vehicles according to claim 1, wherein the second output circuit comprises a third control valve operatively connected to the processing and control unit and controlled by this so that, in a condition of manual operation, the third control valve is closed to hydraulically disconnect the second float from the braking device.

* * * * *